United States Patent [19]

Prevorsek et al.

[11] 4,297,878
[45] Nov. 3, 1981

[54] MEASURING COEFFICIENT OF RADIAL DAMPING OF TIRE WALL SEGMENT

[75] Inventors: Dusan C. Prevorsek; Young D. Kwon, both of Morristown, N.J.

[73] Assignee: Allied Corporation, Morris Township, Morris County, N.J.

[21] Appl. No.: 128,074

[22] Filed: Mar. 7, 1980

[51] Int. Cl.³ .............................................. G01M 17/02
[52] U.S. Cl. ....................................................... 73/146
[58] Field of Search ................. 73/146, 573, 574, 575, 73/579

[56] References Cited

U.S. PATENT DOCUMENTS

| | | | |
|---|---|---|---|
| 3,893,331 | 7/1975 | Prevorsek et al. | 73/15.6 |
| 3,934,452 | 1/1976 | Prevorsek et al. | 73/15.6 |
| 3,969,930 | 7/1976 | Prevorsek et al. | 73/91 |
| 4,056,973 | 11/1977 | Prevorsek et al. | 73/91 |
| 4,150,567 | 4/1979 | Prevorsek | 73/146 |

OTHER PUBLICATIONS

Von Eldik Thieme, H.C.A. et al., The Tire as a Vehicle Component, from Mechanics of Pneumatic Tires, Nov. 1971, pp. 545–547 and 743–752.
Tielking, J. T. et al., Energy Loss ... Tire Model, from Tire Science and Technology, vol. 5, No. 3, 1978, pp. 136–151.
Parikh, P. D., A Finite Element ... Automobile Tire, PHD Thesis, Texas Tech. University, 1977, Index and Abstract only.
Padovan, J., Numerical Simulation of Rolling Tires, SAE Conference Proceedings, P-74, 1977, pp. 87–94.
Brewer, H. K., Tire Science and Technology, vol. 1, No. 1, 1973, pp. 47–76.
Posfalvi, O., Tire Science and Technology, vol. 4, No. 4, 1976, pp. 219–232.

Primary Examiner—Jerry W. Myracle
Attorney, Agent, or Firm—Alan M. Doernberg

[57] ABSTRACT

A method of measuring the coefficient of radial damping per unit length of a tire wall at a predetermined frequency of strain component is applied at a predetermined frequency and amplitude to a segment of the tire wall, the strain being applied in a direction substantially normal to the segment at the point where the strain is applied. The stress on the tire wall segment is continuously measured in a direction substantially parallel to the direction in which the strain component is applied and at a point spaced from the point where strain is applied in a direction along the segment. The coefficient of radial damping per unit length of wall is calculated from this data.

12 Claims, 6 Drawing Figures

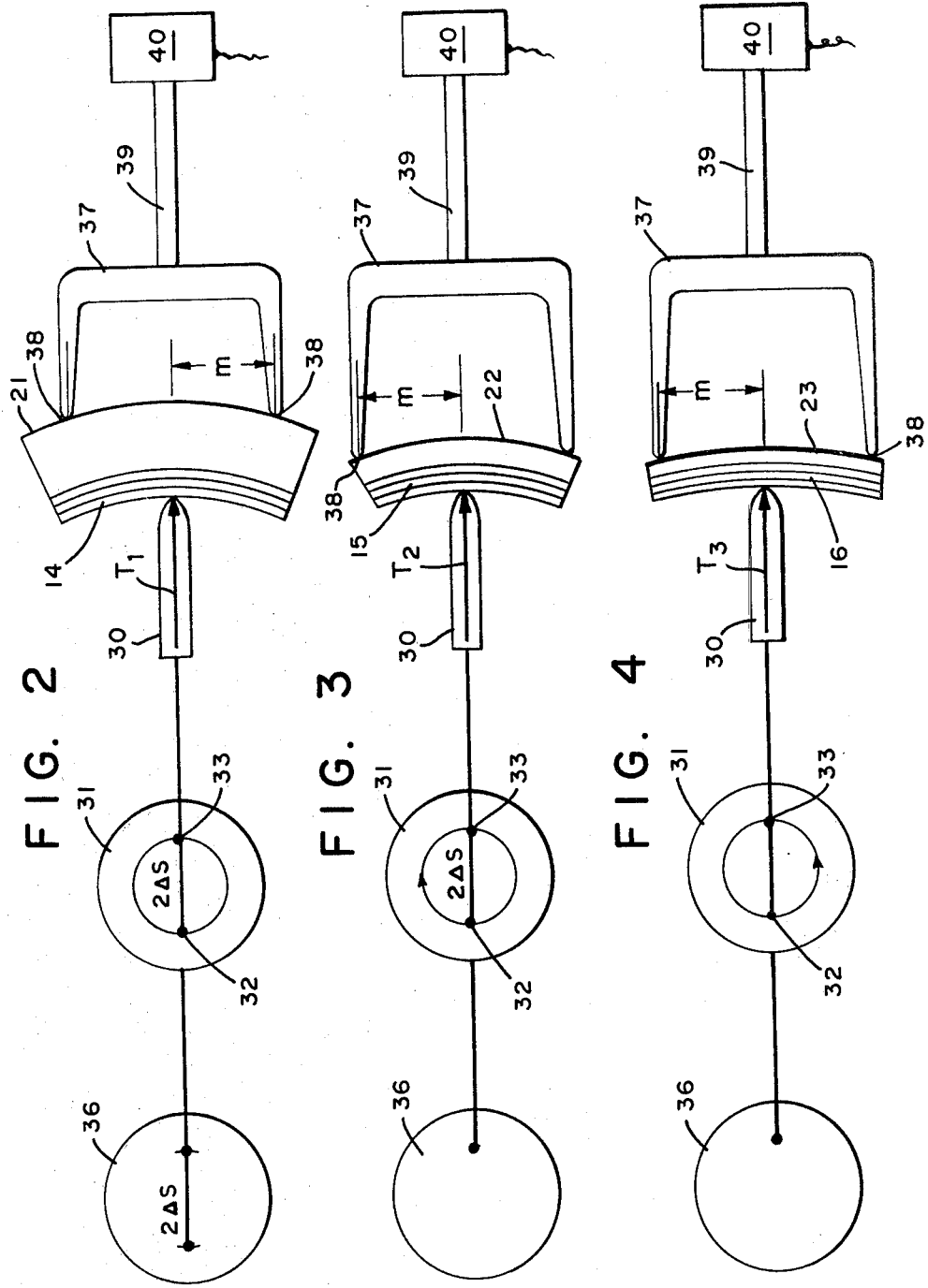

MEASURING COEFFICIENT OF RADIAL DAMPING OF TIRE WALL SEGMENT

DESCRIPTION

BACKGROUND OF THE INVENTION

This invention relates to the measurement of the physical properties of tire wall materials and especially measuring the coefficient of radial damping per unit length of tire wall materials. Such coefficient is useful in determining the standing wave characteristics of tires prepared from such materials and the energy loss or rolling resistance of such tires.

A variety of theoretical models have been proposed to explain the behavior of tires. The circular membrane model of Pacejka includes the modeling of a tire crown portion as a circular membrane. From this model, the displacement of a volume element of tire in the radial direction can be characterized by the formula $$w = C_1 e^{AV_1 \phi} + C_2 e^{AV_2 \phi} \tag{1}$$

where $$AV_{1,2} = \frac{k_r R \pm Z}{2[npR^2 - (S_o/r^2)]} \tag{2}$$

where $$Z = k_r^2 R^2 - 4[npR^2 - (S_o/r^2)][c' - pR^2] \tag{3}$$

In these formulae w is the outward displacement of the volume segment, R is the angular velocity of rotation, $k_r$ is the coefficient of radial damping per unit length, n is the fraction of centrifugal force restored by radial force, r is the tire radius, $\phi$ is the angular coordinate, p is the mass per unit of length, $S_o$ is the tension force on non-rotating tire and AV is the coefficient as defined by Equation (2). It will be appreciated that w is a monotonously decaying function whenever $AV_1$ and $AV_2$ are real (i.e. Z is zero or greater) and w will be a sinusoidal function whenever $AV_1$ or $AV_2$ are non-real (i.e. Z is less than zero) indicating a standing wave. Heretofore it has been suggested that standing waves be predicted based upon the above formulae by assuming $k_r$ to be sufficiently small that the value of Z may be determined disregarding the factor $k_r^2 R^2$. It is now believed that $k_r$ is a significant factor in the prediction of standing waves and, by selection of materials and constructions which have higher values of $k_r$, it is possible to design tires which do not form standing waves at relatively high speeds which can easily be achieved in common vehicles.

BRIEF DESCRIPTION OF THE INVENTION

The present invention includes a method of measuring the coefficient of radial damping per unit length of a tire wall at a predetermined frequency of strain which comprises:

(a) applying a cyclic sinusoidal strain component at a predetermined frequency and at a predetermined amplitude to a tire wall segment, said strain being applied in a direction substantially normal to the segment at the point where strain is applied; and (b) continuously measuring the stress on the tire wall segment at a point spaced from the point where strain is applied in a direction along the segment, the stress being measured in a direction substantially parallel to the direction in which the strain component is applied; the coefficient of radial damping per unit length of wall being calculable as $$(1.5\Delta E)/(\pi m(\Delta S)^2 \cdot OM) \tag{4}$$

where m is the normal distance between the application of strain and the measurement of stress; $\Delta S$ is the predetermined amplitude; OM is the angular velocity of the cyclic sinusoidal strain component and $\Delta E$ is the measured energy loss per cycle.

While the above formula is directly usable to calculate $k_r$ for the geometry of testing shown in FIGS. 2–4, the exact formula used will differ slightly with different geometric configurations. Thus, for example, if one uses the configuration shown in FIG. 5, the formula will be $$k_r = (3\Delta E)/(\pi \cdot m(\Delta S)^2 \cdot OM) \tag{5}$$

with m now being the entire length of the segment and the total amplitude of sinusoidal displacement being $2\Delta S$. Other modifications within the scope and spirit of the present invention will be apparent to one skilled in the art.

This method can be applied to segments of tire wall, either from the crown, the shoulder or the side wall. It is preferred to employ frequencies and amplitudes of strain component typical of tire wall standing waves such as Frequency=200–400 cycles per second, m=0.5–2.0 cm, and S=0.03–0.2 cm.

It is also preferred that stress be measured at a point spaced from the application of strain in the direction in which fibers extend within the tire wall segment.

BRIEF DESCRIPTION OF DRAWING

FIG. 2 is an elevational view of a crown tire segment being tested in accordance with a first embodiment of the invention;

FIG. 3 is an elevational view of shoulder tire segment being tested in accordance with the embodiment of FIG. 2;

FIG. 4 is an elevational view of a side wall tire segment being tested in accordance with the embodiment of FIG. 2;

DETAILED DESCRIPTION OF THE INVENTION

Figure 1:
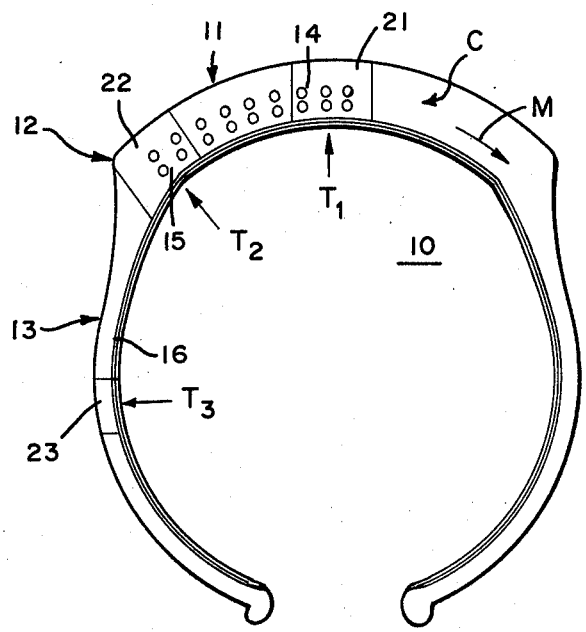
FIG. 1 in an elevational view of a tire in cross-section showing tire segments which may be tested by the method of the invention.

The present invention is based, at least in part, upon the realization that $k_r$ is a significant factor in solving the above equation (3) to determine the presence or nonpresence of standing waves. Values where Z is zero can be found by inserting zero for Z and then solving for R. The result is $$R = \left( -B \pm \sqrt{B^2 - 4AC} \right) / 2A \tag{6}$$

with $$A = 4np^2 \tag{7A}$$

$$B = k_r^2 - 4npc' - (4S_op/r^2) \tag{7B}$$

$$C = 4S_oC'/r^2 \tag{7C}$$

Various tire wall segments can be formed or cut from a tire and subjected to cyclical strain in the manner shown in FIGS. 2-4 and described further below. The motion of an element in the horizontal direction in each of these Figures can be approximated by the equation $$w = w_o + [S(m-x)/m] \cdot \sin(AV \cdot t) \tag{8}$$

where w is the position in the horizontal direction, $w_o$ is the median position in the horizontal direction, S is the displacement amplitude provided by the eccentric wheel, m is the distance between the point where strain is applied and stress is measured, AV is the angular velocity of the application of strain x is the position coordinate of the element and t is time. Considering a specimen of unit width, the force required to overcome the damping effect in the motion of element dx is $f = k_r(dw/dt) \cdot dx$. The work required for moving the element for a distance of dw is $dE = f \cdot dw$. By differentiating equation (8) with respect to time, dw can be computed as a function of $\Delta S$, m, f, OM, x and t. By then integrating over the unit of length and over a complete cycle, $\Delta E$ can be calculated as $$\Delta E = (2\pi/3) \cdot k_r \cdot m \cdot (\Delta S)^2 \cdot OM \tag{9}$$

Solving then for $k_r$ $$k_r = (1.5 \Delta E)/[\pi \cdot m \cdot (\Delta S)^2 OM] \tag{10}$$

From equation (10), $k_r$ can be derived when $\Delta E$, m, $\Delta S$ and OM are known. The present invention uses a measuring system in which the distance between the application of strain and the measurement of stress is predetermined. Furthermore, $\Delta S$, the amplitude of strain and OM, the frequency of strain are also predetermined. Accordingly, only $\Delta E$ need be measured. $\Delta E$, which is the mechanical loss of energy per cycle, is characterized by the area of the loop shown in FIG. 6.

Therefore, it will be seen that, by measuring the energy loss per cycle in the test system shown in the Figures, one can compute a value for $k_r$ which relates in theory to standing wave formation. Additionally, since rolling resistance includes radial damping as a factor, the measurement of $k_r$ enables one to predict a factor in the rolling resistance of a tire.

The present invention includes testing a segment of tire wall. As exemplified by FIGS. 1-4, segments may be taken from either the crown, the shoulder or the side wall of a tire. These segments need not necessarily include the entire thickness of the tire, but may include only one or certain layers. It is in fact desirable to obtain values of $k_r$ for individual layers and for combinations of layers as described below.

Because segments of tire wall are not planar, the dimensions of a segment can only approximate a rectangle or other shape. Nonetheless, it is preferred to take an elongated section having a length substantially greater than its width. It is also preferred that the length be in a direction parallel to the extent of fibers or other oriented reinforcing material in the tire wall.

In the present method, a strain is applied to the tire wall at a point preferably near the center of the tire wall segment along its length. The direction of strain is approximately normal or perpendicular to tire wall segment at the point of application. Stress is measured at at least one point spaced along the tire wall segment from the application of strain. This displacement is preferably relatively small such as between about 0.03 and about 0.2 cm, so as to be significantly less than the amplitude of a standing wave. The amount of displacement by the application of strain is preferably on the order of magnitude of the displacement of a tire between the peaks and valleys of a standing wave. For tires of 35 cm (14 inches) radius, a preferred range of such displacement is between about $\Delta S/m = 0.02$ and about $\Delta S/m = 0.15$. The frequency at which strain is applied is preferably a frequency characteristic either of the rotation of the tire or of the standing wave. Characteristic rotation frequencies are between about 1 and about 20 cycles per second, while frequencies characteristic of standing waves are between about 200 and about 400 cycles per second. As described below, it is desirable to measure $k_r$ at a variety of frequencies so as to determine the frequency dependence of $k_r$.

DESCRIPTION OF THE FIGURES

FIG. 1 is a view of a tire showing crown, shoulder and side wall portions. Thus tire 10 can be seen to include a crown portion 11, a shoulder portion 12 and a side wall portion 13. As is conventional, a direction C or circumferential direction is defined in the crown portion running circumferentially around the tire (into the page in the view shown in FIG. 1). A second direction M or meridional is considered running around the tire in the direction normal to the circumferential direction.

In the tire 10 are a series of reinforcing tire cords made either of organic polymeric fibers such as polyethylene terephthalate (PET), rayon, polycaproamide (nylon 6), poly(hexamethylenediamine adipate) (nylon 66) and polyaramides such as poly(paraminobenzamide) ("Kevlar" being a registered trademark therefore), or of inorganic fibers such as glass fibers or of metal fibers such as steel, or of some combination of fibers or other oriented material such as the fibers or steel cord 14 in the crown portion 11, the fibers or steel cord 15 in the shoulder portion 12 and the fibers or steel cord 16 in the side wall portion 13. It should be appreciated that the reinforcing materials 14, 15 and 16 shown in FIG. 1 are greatly enlarged and would normally comprise polyfilaments.

Tire wall segments comprising the entire thickness of the tire can be cut in the tire 10 such as shown by crown segment 21 in crown 11, shoulder segment 22 in shoulder 12 and side wall segment 23 in end wall 13. Because the fibers 14 and 15 run in the circumferential direction, segments 21 and 22 are relatively narrow in the meridional direction and relatively long in the circumferential direction. Because the fibers 16 in the side wall 13 run meridionally, segment 23 is relatively long in the meridional direction and (although not shown) is relatively narrow in the circumferential direction.

FIG. 2 shows the testing of crown segment 21 according to the present invention. Segment 21 is contacted by a plunger 30 in a direction T1 which is normal to the segment at the point of contact. Plunger 30 is in turn connected to an eccentric wheel 31 so as to displace plunger T1 by a distance $2\Delta S$ by the rotation of the wheel 31. The maximum displacement of plunger 30 to the right occurs when an element of the wheel 31 is at point 33. The minimum displacement of the plunger 30 to the right occurs when the same element of the wheel 31 is at point 32. A displacement measuring device 36 is shown to measure the displacement of plunger 30 in the vertical direction.

Since crown segment 21 is arcuate, the plunger 30 is shown as being on the concave side. As described below, some tire wall segments are substantially planar, in which case the side where strain as applied is less critical. It is nevertheless preferred that the strain always be applied from a direction which, in the complete tire, is an interior side. A bracket 37 is positioned on the right or exterior side of crown segment 21 which contacts the crown portion 21 at two points 38, each spaced from the line in which T1 lies by a distance m. Accordingly, bracket 37 receives the force or stress on segment 21 at points 38 a normal displacement m from the application of strain. The force of stress (in units such as dynes) can be measured by device 40 connected to bracket 37 by a rigid rod 39.

It will be appreciated that measuring devices 36 and 40 can be springs coupled with a stress load cell and stress transducer, examples of which are Model UL-4 load cell and Model UC-3 transducing cell, respectively, both available from Stratham Instruments, Inc. of Oxnard, Cal. Such an apparatus for measuring stress and strain is shown in U.S. Pat. No. 4,056,973 (Nov. 8, 1977) of Prevorsek et al., incorporated herein by reference.

FIG. 3 shows the measurement of the properties of shoulder segment 22. Again the plunger 30 contacts the interior of shoulder segment 22 with a strain component of amplitude ΔS, which strain is measured by displacement measuring device 36. Bracket 37 contacts the exterior of the shoulder segment 22 at points 38 spaced by normal distance m from the application of strain. Bracket 37 is connected by rigid rod 39 to measuring device 40 which measures the stress in units of force such as dynes.

FIG. 4 shows the measurement of similar properties of a side wall segment 23. Since the fibers or steel cord 16 within side wall segment 23 run in a meridional direction, the length of segment 23 is also in a meridional direction. The interior of the side wall 16 is contacted by plunger 30 with a sinusoidal displacement of amplitude ΔS, which displacement is measured by measuring device 36. The exterior of the end wall segment 16 is contacted by bracket 37 at points 38 displaced by normal distance m from the application of strain. The stress is transmitted from the bracket 37 by a rigid rod 39 to a measuring device 40.

Figure 5:
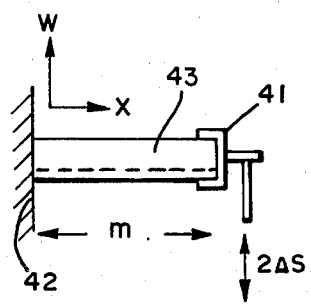
FIG. 5 is an elevational view of a tire wall segment being tested in accordances with a second embodiment of the invention.

FIG. 5 shows the measurement of similar properties of a segment 43 which may be taken from any portion of a tire. One end of segment 43 is fixed to an anchor 42 whose displacement in the vertical direction w and horizontal direction x is monitored. A clamp 41 is fixed to the opposite end of segment 43 and connected to a sinusoidal displacement of amplitude ΔS as is the plunger 30 of FIGS. 2-4. Anchor 42 is connected to a measuring device of the force of stress such as device 40 in FIGS. 2-4. The displacement of bracket 41 is measured by a device like measuring device 36 of FIGS. 2-4.

EXAMPLE 1

Figure 6:
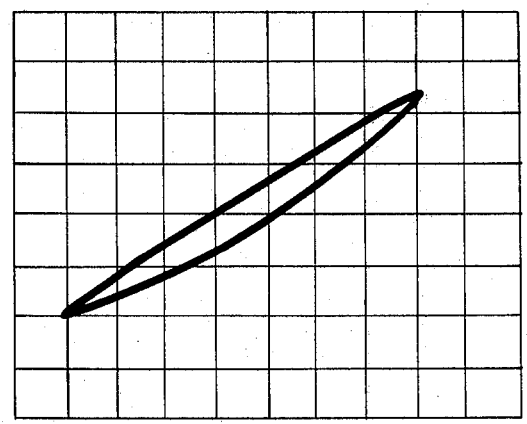
FIG. 6 is a graphic view of the relationship between stress and strain as measured in the method of the invention.

A rectangular block was cut out of the belt of a steel-belted radial tire (called Tire C). The segment was 4 cm long, 1.8 cm wide and 0.8 cm thick. It was mounted in the manner shown in FIG. 4 with the steel cable running in a meridional direction along the length of the segment. Under conditions of room temperature (24° C.), 10 cycles per second frequency of displacement and 0.07 cm ΔS; the displacement versus force of stress was measured continuously and ploted on an oscilloscope connected to both measuring devices. A hysteresis loop was plotted which stabilized after 30 minutes. It was as shown in FIG. 6 with each mark in the vertical direction representing 1 kg of force and each line in the horizontal direction representing 0.02 cm.

The area was integrated and found to be equivalent to $6.86 \times 10^4$ ergs per cycle. A value for $k_r$ was then calculated according to above formula 4 as $$\frac{(1.5) \times (0.86 \times 10^4)}{(3.14)(1.4)(0.07)(0.07)(62.8)}$$

or $7.007 \times 10^4$ poise. This value was then corrected by a factor for the effect of angular velocity (1/28), a factor for the size of the specimen (8/width=4.44) and a factor for the effect of frequency (1.65). These factors are based upon formulae and experimental measurements. A corrected $k_r$ was then computed as:

$$(7.607 \times 10^4)(1/28)(4.44)(1.65) = 1.98 \times 10^4 \text{ poise.}$$

EXAMPLES 2-5

Four specimens of size 4 cm×1.8 cm×0.8 cm were tested in like manner using 0.7 mm strain amplitude (ΔS). The specimens were as follows:
  (2) a steel rubber composite,
  (3) a PET rubber composite #1,
  (4) a PET rubber composite #2, and
  (5) a PET rubber composite #3.
    (2600/3/2)

The results are shown in the following Table (in units of $10^4$ erg/cycle:

| Example | Frequence in cycles/sec | | | | |
|---|---|---|---|---|---|
| | 5 | 10 | 20 | 28 | 60 |
| 2 | 6.4 | 6.6 | 6.9 | 7.2 | 7.5 |
| 3 | 3.0 | 3.4 | 3.8 | 4.0 | 4.7 |
| 4 | 2.1 | 2.5 | 3.0 | 3.4 | 3.9 |
| 5 | 0.72 | 0.89 | 1.3 | 1.45 | 2.1 |

These results were plotted on double logarithmic paper and showed four straight lines of different slopes. The line for each sample was extrapolated to 300 cycles per second and the slope characterized by the mechanical loss Q at 300 cycles per second divided by the mechanical loss Q at 10 cycles per second. This quotient was 1.3, 1.8, 2.3 and 4.6 for the four samples, suggesting that PET-rubber tires prepared from such composites would have a lower $k_r$ (and thus less rolling resistance) than the rubber-steel tire at the lower frequencies characteristic of the tire's rotation, but a $k_r$ almost as high as that of the rubber-steel tire at the higher frequency (and thus almost as much damping of standing waves).

EXAMPLES 6-8

Specimens were taken of the steel and composites of belt portions of three steel-belted radial tires (A, B and C), each 4 cm long and 1.8 cm wide except that the steel portion of C was 4.1 cm long, and both the steel and composite portions of A were 1.75 cm wide. The thicknesses were:

A—0.17 cm steel, 0.76 cm composite
B—0.2 cm steel, 0.8 cm composite
C—0.19 cm steel, 0.8 cm composite The mass densities (in kg/m) were: 1.41, 1.29 and 1.41 for the respective segments. This is computed as [weight×(100/L)×8/w]+[rubber density×100×8×(1.8−H)] where L, W and H are the length, weight and width of the segment. Each specimen was tested as in Example 1 at a frequency of 10 cycles per second and an amplitude ($\Delta S$) of 0.7 mm. The mechanical losses ($\Delta E$) and computed $k_r$ values were;

|   |           | $\Delta E (\times 10^4$ erg cycle) | $k_r$ |
|---|-----------|---|---|
| A | steel     | 7.5 | |
|   | composite | 12.7 | 3.65 |
| B | steel     | 1.29 | |
|   | composite | 9.28 | 2.97 |
| C | steel     | 0 | |
|   | composite | 6.86 | 1.98 |

Other parameters for these tires were measured by standard techniques and determined as follows:

|   | A | B | C |
|---|---|---|---|
| $C_s$ (Newton) | $5.90 \times 10^5$ | $4.60 \times 10^5$ | $5.25 \times 10^5$ |
| $C_r$ (N/m$^2$) | $7.50\ 33\ 10^5$ | $5.86 \times 10^5$ | $6.68 \times 10^5$ |
| $S_o$ (N) | 1920 | 1920 | 1920 |
| r (m) | 0.356 | 0.356 | 0.356 | using the abbreviations of equations (1)–(3) above, and with $C_s$ and $C_r$ being the factors in equation (6). All tires were inflated at 207 kPa pressure (30 psi) and then rotated at increasing speeds until standing waves formed. The speeds at which starting waves were formed (critical speed) and average forces of acceleration were estimated using equation (1) as follows:

|   | A | B | C |
|---|---|---|---|
| critical speed | | | |
| mile per hour | 109 | 105 | 89 |
| km/h | 175.4 | 169.0 | 143.2 |
| force | | | |
| dynes | $11.4 \times 10^6$ | $6.8 \times 10^6$ | $6.9 \times 10^6$ |

Actual experiments on a wheel test system gave values of

|   | A | B | C |
|---|---|---|---|
| critical speed in | | | |
| miles per hour | 120 | 115 | 105 |
| km/h | 193.1 | 185.1 | 169.0 |

The wavelength of the standing wave at such speed was also computed from $k_r$ and was 45, 37 and 20 degrees compared to 36, 31 and 22 degrees actually observed.

What is claimed is:

1. A method of measuring the coefficient of radial damping per unit length of a tire wall at a predetermined frequency of strain which comprises:
   (a) applying a cyclic sinusoidal strain component at a predetermined frequency and at a predetermined amplitude to a tire wall segment, said strain being applied in a direction substantially normal to the segment at the point where strain is applied; and
   (b) continuously measuring the stress on the tire wall segment at a point spaced from the point where strain is applied in a direction along the segment, the stress being measured in a direction substantially parallel to the direction in which the strain component is applied; the coefficient radial damping per unit length of wall being calculable as $(1.5\Delta E)/(\pi m (\Delta S)^2 \cdot OM)$ where m is the normal distance between the application of strain and the measurement of stress; $\Delta S$ is the predetermined amplitude; OM is the angular velocity of the cyclic sinusoidal strain component and $\Delta E$ is the measured energy loss per cycle.

2. The method of claim 1 wherein said tire wall segment is an annular segment of tire crown extending in a circumferential direction.

3. The method of claim 1 wherein said tire wall segment is a segment of tire side wall extending in a meridional direction.

4. The method of claim 1 or claim 2 or claim 3 wherein said tire wall segment is a multilayer structure.

5. The method of claim 4 wherein the strain component is applied and the stress is measured for at least two combinations of layers of the multilayer structure.

6. The method of claim 1 wherein the sinusoidal strain of the component is applied by a rotating wheel with an eccentricity, said eccentricity being equal in magnitude to the predetermined amplitude.

7. The method of claim 1 wherein the stress is continuously measured at a plurality of frequencies of strain whereby the dependency of a coefficient of radial damping per unit length can be calculated as a function of frequency.

8. The method of claim 1 wherein the predetermined amplitude is between about 0.03 and 0.2 cm.

9. The method of claim 1 wherein the angular velocity of strain is between about 2 and about 400 radians per second.

10. The method of claim 1 wherein m is between about 0.5 and about 2.0 cm.

11. The method of claim 1 wherein strain is applied to the middle of the tire wall segment and stress is measured at at least one end of the tire wall segment.

12. The method of claim 1 wherein strain is applied adjacent one end of the tire wall segment and stress is measured adjacent the opposite end of the tire wall segment.

* * * * *